(12) United States Patent
Hirade

(10) Patent No.: US 7,050,484 B2
(45) Date of Patent: May 23, 2006

(54) METHOD OF DETECTING PATH TIMINGS AND CDMA RECEIVING APPARATUS USING THE SAME

(75) Inventor: Sei Hirade, Tokyo (JP)

(73) Assignee: NEC Corporation, Tokyo (JP)

( * ) Notice: Subject to any disclaimer, the term of this patent is extended or adjusted under 35 U.S.C. 154(b) by 1128 days.

(21) Appl. No.: 09/895,320

(22) Filed: Jul. 2, 2001

(65) Prior Publication Data

US 2002/0015399 A1 Feb. 7, 2002

(30) Foreign Application Priority Data

Jul. 4, 2000 (JP) ............................. 2000-202819

(51) Int. Cl.
*H04B 1/707* (2006.01)
(52) U.S. Cl. ..................................................... 375/148
(58) Field of Classification Search ........ 375/142–145, 375/148–150, 152; 370/320, 335, 342, 441
See application file for complete search history.

(56) References Cited

U.S. PATENT DOCUMENTS

| 6,064,338 | A * | 5/2000 | Kobayakawa et al. | 342/378 |
| 6,480,523 | B1 * | 11/2002 | Kondo | 375/140 |
| 6,904,076 | B1 * | 6/2005 | Tsutsui et al. | 375/130 |
| 2001/0014116 | A1 * | 8/2001 | Saito et al. | 375/148 |

FOREIGN PATENT DOCUMENTS

| EP | 0877493 A2 | 11/1998 |
| JP | 2751959 | 2/1998 |
| JP | 10-164011 | 6/1998 |
| JP | 10-308689 A | 11/1998 |
| JP | 2853705 | 11/1998 |
| JP | 11-4212 | 1/1999 |
| JP | 11-251962 | 9/1999 |
| JP | 11-266183 A | 9/1999 |
| JP | 2000-78110 A | 3/2000 |
| WO | WO 00/04648 A1 | 1/2000 |

OTHER PUBLICATIONS

Fukimoto S et al: "Matched Filter-Based RAKE Combiner for Wideband DS-CDMA Mobile Radio" IEICE Transactions on Communications, Inst. of Electronics Information and Comm. Eng. Tokyo, Japan vol. E81-B, No. 7, Jul. 1, 1998, pp. 1384-1390.

(Continued)

*Primary Examiner*—Don N. Vo
(74) *Attorney, Agent, or Firm*—Sughrue Mion, PLLC

(57) ABSTRACT

A CDMA receiving apparatus includes a searcher section, a finger section, a RAKE synthesizing section and a decoding section. The searcher section has a protection path memory, generates a delay profile from a reception signal, and finds peaks from the delay profile based on a variable peak level reference threshold value and a variable noise level reference threshold value which are determined based on the delay profile. Also, the searcher section reads out protection path data in a previous cycle from the protection path memory, and determines timings of valid paths based on timing of the found peaks and protection path timings of the read out protection path data. The finger section detects a signal from the reception signal for every path in response to the valid path timings. The RAKE synthesizing section carries out RAKE synthesis to the detected signals to produce a RAKE synthesis signal. The decoding section decodes the RAKE synthesis signal.

24 Claims, 14 Drawing Sheets

OTHER PUBLICATIONS

Miyatani T et al: "A Reduced-Complexity Path Timing Detection Method for DS-CDMA" Universal Personal Communications, 1998. ICUPC '98. IEEE 1998 International Conference on Florence, Italy Oct. 5-9, 1998, New York, NY, USA, IEEE, US, Oct. 5, 1998, pp. 357-361.

* cited by examiner

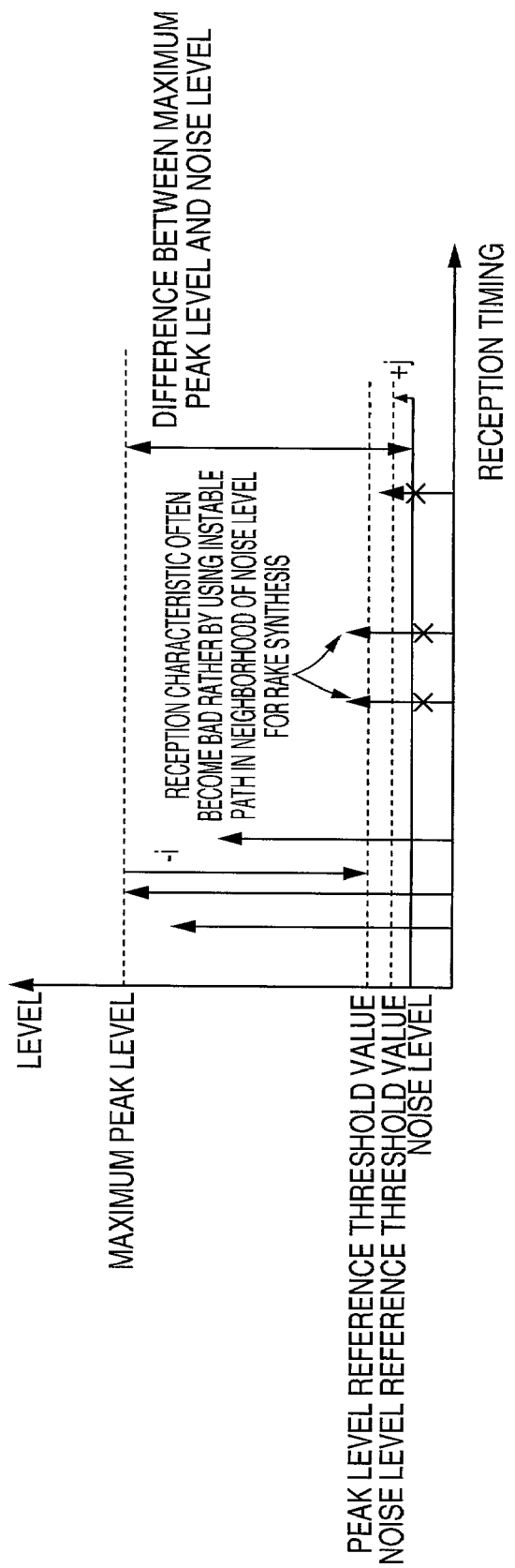

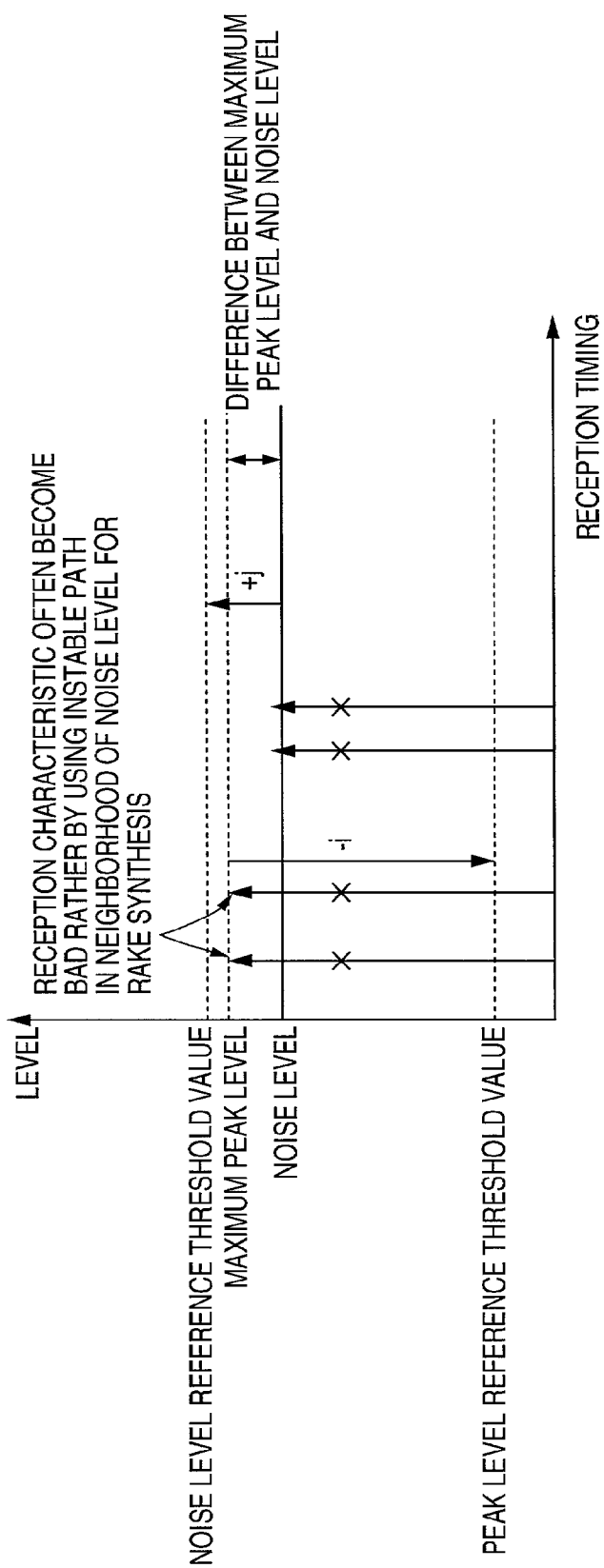

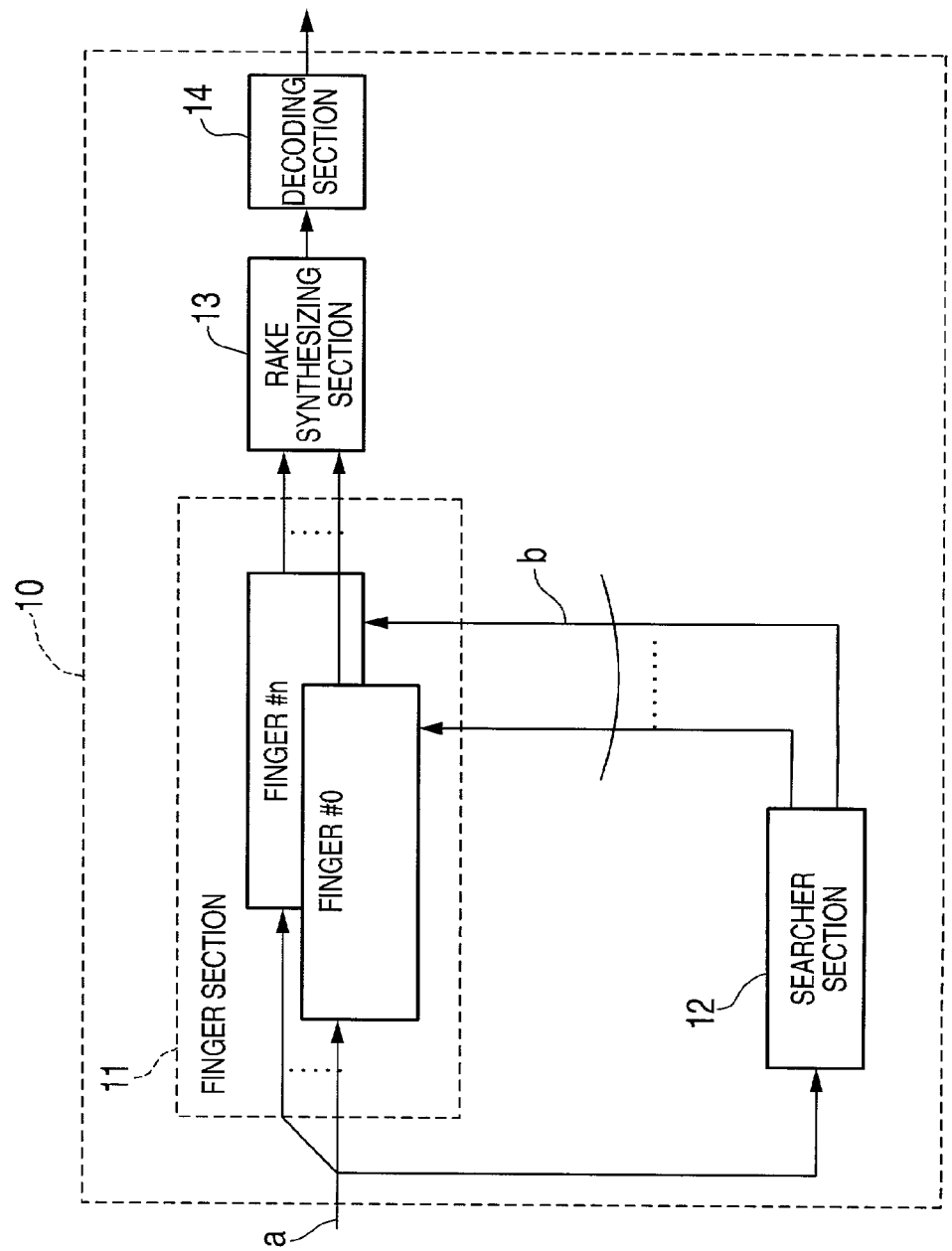

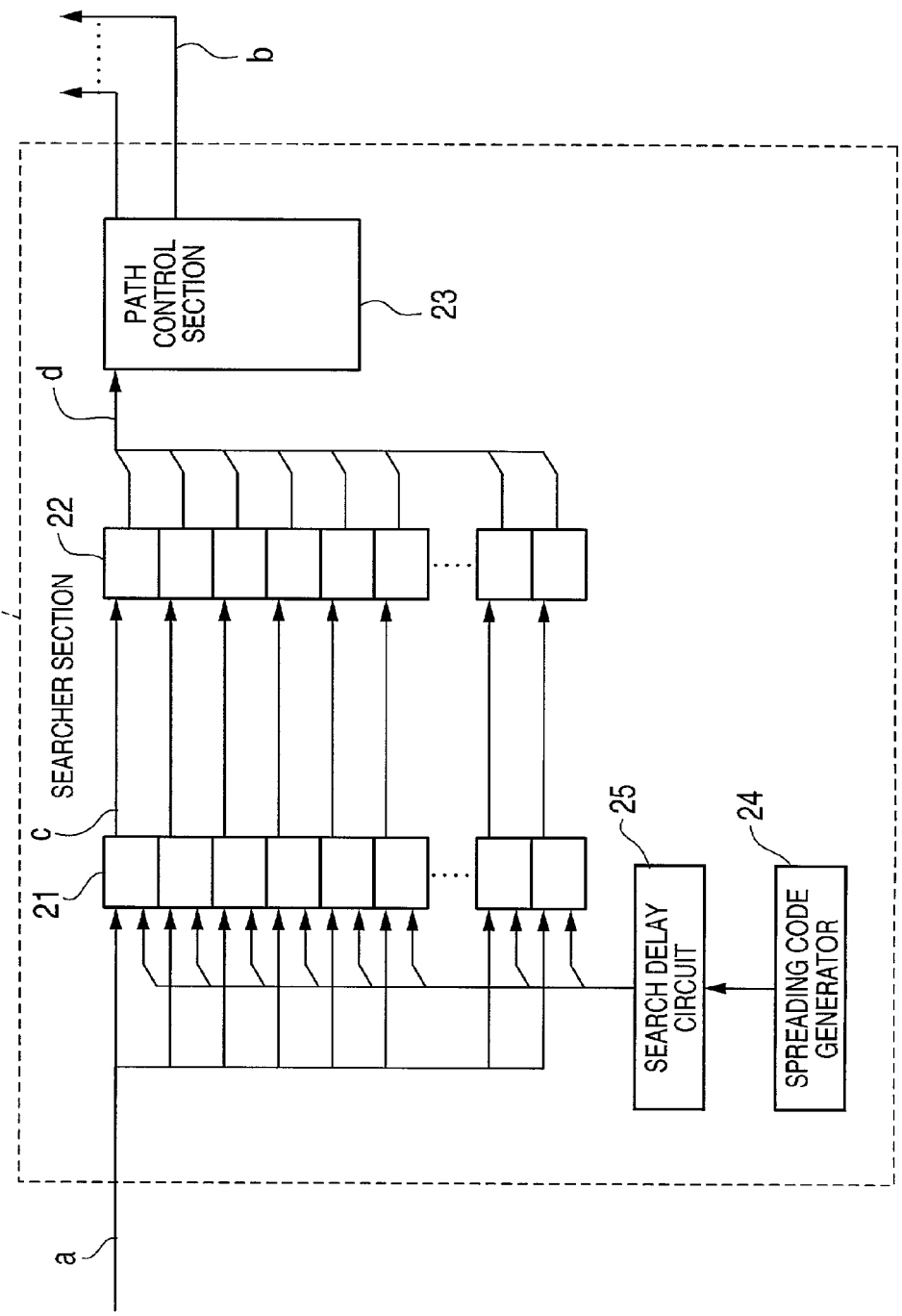

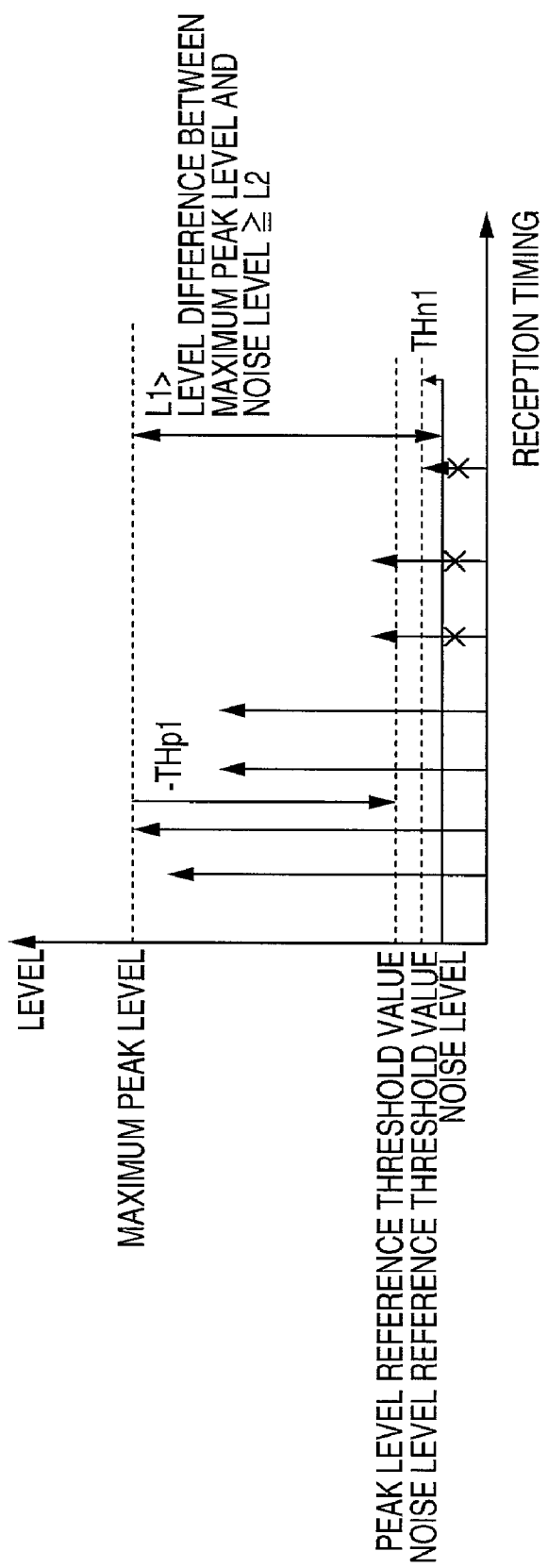

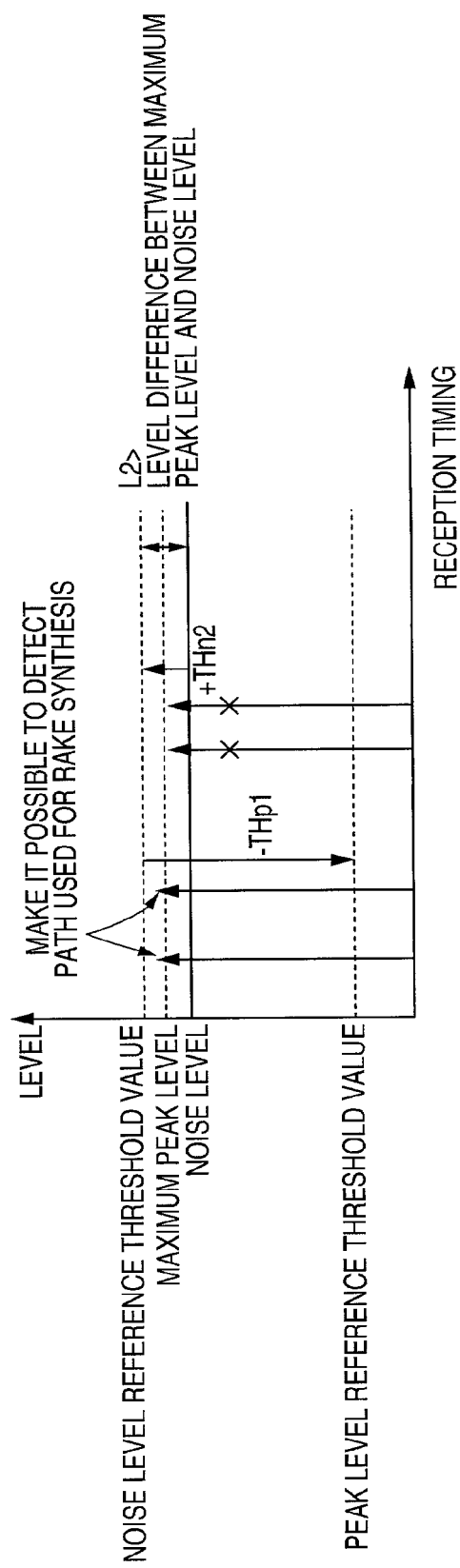

METHOD OF DETECTING PATH TIMINGS AND CDMA RECEIVING APPARATUS USING THE SAME

BACKGROUND OF THE INVENTION

1. Field of the Invention

The present invention relates to a CDMA (Code division multiple access) receiving apparatus and a method of detecting a path.

2. Description of the Related Art

A CDMA receiving apparatus is conventionally known which is composed of a finger section, a searcher section and a RAKE synthesizing section, the searcher section is composed of a correlation unit group, an adder group and a path control section. The path control section searches a reception timing with a high level from correlation values before and after the addition, and the finger section determines the reception timing. The finger section detects a valid path at the determined reception timing, and the RAKE synthesizing section RAKE-synthesizes the detected paths.

The path control section in the conventional CDMA receiving apparatus will be described below with reference to FIG. 1.

FIG. 1 is a block diagram showing the structure of the path control section of the conventional CDMA receiving apparatus. As shown in FIG. 1, the conventional path control section 23 is composed of a peak detecting section 31, a threshold value processing section 32, a memory section 33 and a protection processing section 34. Also, the above-mentioned threshold value processing section 32 is composed of a reference threshold value calculating section 322 and a determining section 323. The above-mentioned memory section 33 is composed of a threshold value memory section 331 and a protection path memory section 332.

In the above-mentioned threshold value processing section 32, the above-mentioned reference threshold value calculating section 322 reads a maximum peak level threshold value i and a noise level threshold value j from the above-mentioned threshold value memory section 331. Then, the reference threshold value calculating section 322 calculates a peak level reference threshold value k ((a peak level reference threshold value k)=(the maximum peak level)−(the maximum peak level threshold value i)) from the above-mentioned maximum peak level threshold value i and the maximum peak level which is sent from the above-mentioned peak detecting section 31 (not to shown). Also, the reference threshold value calculating section 322 calculates the noise level reference threshold value l ((noise level reference threshold value l)=(a noise level g)+(a noise level threshold value j)) from the noise level g which is sent from peak detecting section 31 and the above-mentioned noise level threshold value j. Moreover, the above-mentioned reference threshold value processing section 322 outputs the above-mentioned calculated peak level reference threshold value k and the above-mentioned noise level reference threshold value l to the above-mentioned determining section 323.

In the above-mentioned threshold value processing section 32, the above-mentioned determining section 323 carries out threshold value processing to select a path higher than the above-mentioned peak level reference threshold value k and the above-mentioned noise level reference threshold value l from the peak levels f which are sent from the peak detecting section 31. Then, a reception timing of the selected path is set to a search peak timing m. Also, the peak level of the selected path is set to the search peak level n. The above search peak timing m, the above-mentioned peak level, and the search peak level n are outputted to the above protection processing section 34.

The above protection processing section 34 reads the protection path timing p and protection path state q as a result of the protection processing in the previous cycle from the above protection path memory section 332. Then, the protection processing section 34 carries the protection process using the search peak timing m as a reception timing of the path which is found out in a current cycle and determines a valid path. Then, the protection processing section 34 outputs the reception timing of each path determined to be a valid path as a search path timing b to the finger section 11. Also, the protection processing section 34 writes a protection path timing p and a protection path state q as a result of current cycle in the protection path memory section 332.

When the reception timing of the path which has been found out in the processing in the previous cycle is not found out in the processing in the current cycle, it is not determined in the above protection processing that the concerned path is an invalid path, but it is determined that the concerned path is an invalid path when his status continues for a predetermined number of times (front protection processing). In the same way, the path which is first found out in the current cycle is not determined to be a valid path, but the path is determined to be a valid path when the path is found out at the reception timing for the predetermined number of times (back protection processing). This predetermined number of times is possible to set using a parameter. The protection processes is carried out in such a manner that the allocation of the valid path does not change frequently even if the reception level change due to fading and so on and the reception timing changes little.

Next, a specific example of the conventional threshold value process will be described with reference to FIGS. 2A and 2B.

FIGS. 2A and 2B are graphs showing a specific example of the conventional threshold value process.

In the conventional threshold value process, the path equal to or lower than the peak level reference threshold value k is not used due to a peak level reference threshold value k in the region where the propagation environment is good, as shown in 2A, even if a peak level is equal to or higher than the noise level reference threshold value l. The RAKE synthesis is carried out using paths equal to or higher than the peak level reference threshold value k. Also, the path equal to or lower than the noise level reference threshold value l is not used due to the noise level reference threshold value l in the region where the propagation environment is bad, as shown in FIG. 2B, even if a peak level is equal to or higher than the peak level reference threshold value k. The RAKE synthesis is carried out using paths equal to or higher than the noise level reference threshold value l.

However, there are the following problems in the above-mentioned conventional technique. FIG. 3 is a graph showing a conventional threshold value processing example in the propagation environment in which there is a stronger path so as to be error fee.

The first problem is in that a path unstable near a noise level is used for the RAKE synthesis depending on the value of the maximum peak level threshold value in the propagation environment in which there is so a stronger path as to be error free, so that the reception characteristic is deteriorated, as shown in FIG. 3. The reason is in that means for carrying out the optimal threshold value processing is not provided in case of being the propagation environment in which there has so a stronger path as to be error free in the conventional method of detecting path timings.

FIG. 4 is a graph showing the conventional threshold value processing example in the propagation environment near a sensitivity point.

The second problem is in that all paths corresponding to the peaks which are found out in the current cycle are handled as invalid paths in the threshold value processing depending on the value of a noise level threshold value j, in the propagation environment near the sensitivity point and the path to be used for RAKE synthesis can not be detected so that the reception characteristic is deteriorated, as shown in FIG. 4. The reason is in that means for carrying out the optimal threshold value processing is not provided in case of the propagation environment near the sensitivity point in the conventional method of detecting path timings.

In conjunction with the above description, a spectrum spreading communication apparatus is disclosed in Japanese Laid Open Patent application (JP-A-Heisei 10-164011). In this reference, the spectrum spreading communication apparatus is composed of a plurality of demodulation correlation units for dispreading a reception signal which is subjected to spectrum spreading and for demodulating. A plurality of tracking correlation units are for synchronization tracking of the demodulation correlation units. A search correlation unit searches the phase of demodulation despreading code. A RAKE synthesizing unit synthesizes matches the phases of the outputs of the plurality of demodulation correlation units and carries out a weighting operation. A search processing section sorts the correlation values outputted in order from the search correlation units in a larger order and gives candidates of the phase of the demodulation despreading code to the tracking correlation units. A demodulation path selecting section is provided to be composed of a section for comparing the plurality of peaks outputs from the tracking correlation units with each other. A selecting section selects phases of the above-mentioned peak outputs in order from the maximum peak. A giving section gives the selected phases to the plurality of demodulation correlation units as the phases of the demodulation despreading code.

Also, a spectrum spreading communication apparatus is disclosed in Japanese Laid Open Patent application (JP-A-Heisei 11-4212). In this reference, signals (f1-1 to f1-4) of a plurality of narrowband are extracted from a signal (f1) in a frequency band used for spectrum spreading communication using a plurality of band path filters (7a to 7d), respectively. The level of each of these extracted signals is compared with a predetermined threshold value. It is determined that a reception wave exist when each of all the signals is equal to or higher than a threshold value.

A Cellar system, a mobile terminal, a base station unit and a method of detecting an optimal path are disclosed in Japanese Laid Open Patent application (JP-A-Heisei 11-251962). In this reference, a cellar system using a code division multiple access (CDMA) system is composed of a plurality of finger circuits and a search engine section. The search engine section is composed of a reception level measuring section which detects a reception level of the reception signal and compares the reception level with a predetermined threshold value. A plurality of despreading sections multiply the reception signal and spreading codes. An internal memory stores correlation signals from the plurality of despreading sections. A reception path timing generating section detects a reception path from outputs of the internal memory and generates path timing. It is determined whether or not the correlation signals of the internal memory should be outputted to the reception path timing generating section, in accordance with the comparing and determining result of the reception level measuring section.

Also, a reception timing detection circuit of a CDMA receiving apparatus is disclosed in Japanese Patent No. 2,751,959. In this reference, the reception timing detection circuit of the CDMA receiving apparatus is used for a mobile communication system using a direct spreading code division multiple access (DS-CDMA) system. The reception timing detection circuit is composed of a series correlation unit which calculates correlation signals between a reception signal and a known signal sequence for every predetermined period within a predetermined time interval, and outputs the correlation signals indicating the correlations. An interpolation filter samples the correlation signal again at a frequency which is higher than a sampling frequency and outputs a sampled correlation signal. A power calculating section calculates the power of the sampled correlation signal and outputs the calculated correlation signal powers. An averaging section averages the calculated correlation signal powers over a plurality of periods and outputs an average correlation signal power. A peak detecting section detects a peak of the average correlation signal power, and determines timing when the peak is detected as a reception timing of the CDMA receiving apparatus.

A spectrum spreading communication receiver is disclosed in Japanese Patent No. 2,853,705. In this reference, the spectrum spreading communication receiver is composed of a spreading code generating section for generating a spreading code, and a demodulating section for demodulating a received signal. A demodulation signal is outputted from the demodulating section as a composite data. A searcher section inputs the demodulation signal from the demodulating section and the spreading code from the spreading code generating section and finds a plurality of search paths having correlation peaks which are apart from each other by one or more chips in a search region based on the demodulation signal and the spreading code. A tracking section tracks a plurality of tracking paths which are apart from each other by one or more chips based on correlations between the demodulation signal and the spreading code, and finds correlation levels between the tracking paths. A path capturing and holding section compares the search path from the searcher section and a tracking path from the tracking section, carries out back protection in case of coincidence detection of the paths and carries out front protection in case of extinction of the paths. The path capturing and holding section classifies the path holding state of the tracking path into a complete step out state, a back protection state, a complete protection state, and a front protection state, and holds a plurality of paths. A correlation demodulation path selecting section selects and output a path to be demodulated based on the path state from the path capturing and holding section and the correlation level from the tracking section. A RAKE section detects the demodulation path indicated from the correlation demodulation path selecting section based on the correlation between the demodulation signal from the demodulating section and the spreading code from the spreading code generating section and carries out RAKE synthesis to output as the demodulation data. A demodulating section decodes the demodulation data from the RAKE section and outputs decoding data.

SUMMARY OF THE INVENTION

Therefore, an object of the present invention is to provide a CDMA receiving apparatus and a method of detecting path timings in which the optimal threshold value processing can be carried out even in all the propagation environments including a propagation environment which there is so a stronger path as to be error free, and a propagation environment near a sensitivity point, and which realizes a good reception characteristic.

In an aspect of the present invention, a CDMA receiving apparatus includes a searcher section, a finger section, a RAKE synthesizing section and a decoding section. The searcher section has a protection path memory, generates a delay profile from a reception signal, and finds peaks from the delay profile based on a variable peak level reference threshold value and a variable noise level reference threshold value which are determined based on the delay profile. Also, the searcher section reads out protection path data in a previous cycle from the protection path memory, and determines timings of valid paths based on timing of the found peaks and protection path timings of the read out protection path data. The finger section detects a signal from the reception signal for every path in response to the valid path timings. The RAKE synthesizing section carries out RAKE synthesis to the detected signals to produce a RAKE synthesis signal. The decoding section decodes the RAKE synthesis signal.

Here, the searcher section may variably determine the variable peak level reference threshold value and the variable noise level reference threshold value based on a maximum peak level and a noise level in the delay profile. In this case, the searcher section may have a threshold value memory storing a maximum peak level threshold value and a noise level threshold value. The searcher section may calculate a level difference between the maximum peak level and the noise level in the delay profile, and read out the maximum peak level threshold value and the noise level threshold value from the threshold value memory based on the level difference, and determine the variable peak level reference threshold value and the variable noise level reference threshold value based on the maximum peak level and the noise level in the delay profile and the maximum peak level threshold value and the noise level threshold value.

Also, the searcher section may determine the variable peak level reference threshold value by subtracting the maximum peak level threshold value from the maximum peak level, and the variable noise level reference threshold value by adding the noise level threshold value to the noise level.

Also, the maximum peak level threshold value may have a larger value when the level difference is lager and the noise level threshold value may have a smaller value when the level difference is smaller.

Also, the searcher section may find the peaks from the delay profile based on the variable peak level reference threshold value and the variable noise level reference threshold value which are determined based on the protection path data in addition to the delay profile. In this case, the searcher section may variably determine the variable peak level reference threshold value and the variable noise level reference threshold value based on a maximum peak level for the valid paths indicated by the protection path data and a noise level in the delay profile.

Also, the searcher section may have a threshold value memory storing a maximum peak level threshold value and a noise level threshold value. In this case, the searcher section may calculate a level difference between the maximum peak level and the noise level in the delay profile, and read out the maximum peak level threshold value and the noise level threshold value from the threshold value memory based on the level difference, and determine the variable peak level reference threshold value and the variable noise level reference threshold value based on the maximum peak level and the noise level in the delay profile and the maximum peak level threshold value and the noise level threshold value.

Also, the searcher section may determine the variable peak level reference threshold value by subtracting the maximum peak level threshold value from the maximum peak level, and the variable noise level reference threshold value by adding the noise level threshold value to the noise level. In addition, the maximum peak level threshold value may have a larger value when the level difference is lager and the noise level threshold value may have a smaller value when the level difference is smaller.

Also, the searcher section may variably determine the variable peak level reference threshold value and the variable noise level reference threshold value based on a time average of peak levels of the valid paths indicated by the protection path data and a time average of noise levels in place of the maximum peak level and the noise level in the delay profile. In this case, when the searcher section have a threshold value memory storing a maximum peak level threshold value and a noise level threshold value, the searcher section may calculate a level difference between the peak level time average and the noise level time average, and read out the maximum peak level threshold value and the noise level threshold value from the threshold value memory based on the level difference, and determine the variable peak level reference threshold value and the variable noise level reference threshold value based on the maximum peak level and the noise level in the delay profile and the maximum peak level threshold value and the noise level threshold value.

In this case, the searcher section may determine the variable peak level reference threshold value by subtracting the maximum peak level threshold value from the maximum peak level, and the variable noise level reference threshold value by adding the noise level threshold value to the noise level. In addition, the maximum peak level threshold value may have a larger value when the level difference is lager and the noise level threshold value may have a smaller value when the level difference is smaller.

In another aspect of the present invention, a method of determining path timings in a CDMA receiving apparatus may be attained by (a) generating a delay profile from a reception signal; by (b) finding peaks from the delay profile based on a variable peak level reference threshold value and a variable noise level reference threshold value which are determined based on the delay profile; by (c) reads out protection path data in a previous cycle from the protection path memory; and by (d) determining timings of valid paths based on timing of the found peaks and protection path timings of the read out protection path data.

Here, the (b) step may be attained by (e) variably determining the variable peak level reference threshold value and the variable noise level reference threshold value based on a maximum peak level and a noise level in the delay profile.

In this case, the (e) step may be attained by (f) calculating a level difference between the maximum peak level and the noise level in the delay profile; by (g) reading out a maximum peak level threshold value and a noise level threshold value from a threshold value memory based on the level difference, the threshold value memory storing the maximum peak level threshold value and the noise level threshold value; and by (h) determines the variable peak level reference threshold value and the variable noise level reference threshold value based on the maximum peak level and the noise level in the delay profile and the maximum peak level threshold value and the noise level threshold value.

Also, the (h) step may be attained by (i) determining the variable peak level reference threshold value by subtracting the maximum peak level threshold value from the maximum peak level, and the variable noise level reference threshold value by adding the noise level threshold value to the noise level.

Also, the maximum peak level threshold value has a larger value when the level difference is lager and the noise level threshold value has a smaller value when the level difference is smaller.

Also, the (b) step may be attained by (j) finding peaks from the delay profile based on a variable peak level reference threshold value and a variable noise level reference threshold value which are determined based on the protection path data in addition to the delay profile.

In this case, the (j) step may be attained by variably determining the variable peak level reference threshold value and the variable noise level reference threshold value based on a maximum peak level for the valid paths indicated by the protection path data and a noise level in the delay profile.

Also, the (b) step may be attained by (k) variably determining the variable peak level reference threshold value and the variable noise level reference threshold value based on a time average of peak levels of the valid paths indicated by the protection path data and a time average of noise levels in place of the maximum peak level and the noise level in the delay profile.

BRIEF DESCRIPTION OF THE DRAWINGS

FIG. 3 is a graph showing an example of conventional threshold value processing in propagation environment in which there is so a stronger path as to be error free;

FIG. 4 is a graph showing an example of conventional threshold value processing in a propagation environment near a sensitivity point;

FIG. 5 is a block diagram showing the structure of a CDMA receiving apparatus according to a first embodiment of the present invention;

FIG. 6 is a block diagram showing the detailed structure of a searcher section in the first embodiment;

FIGS. 10A to 10C are graphs showing specific examples of threshold value processing in accordance with a level difference h between a maximum peak level and a noise level g;

DESCRIPTION OF THE PREFERRED EMBODIMENTS

Figure 1:
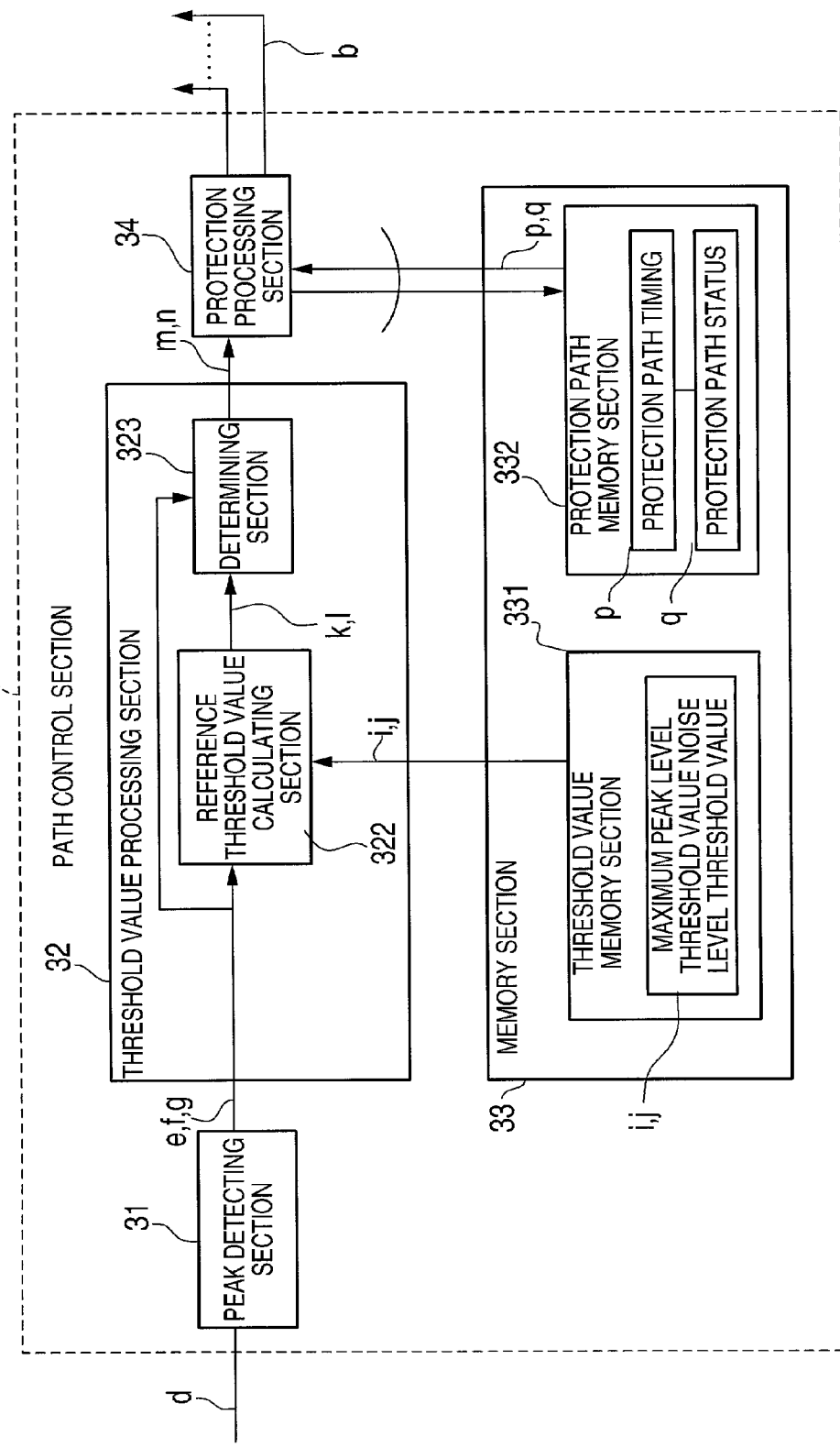
FIG. 1 is a block diagram showing the structure of a path control section in a conventional CDMA receiving apparatus.
Figure 2A:
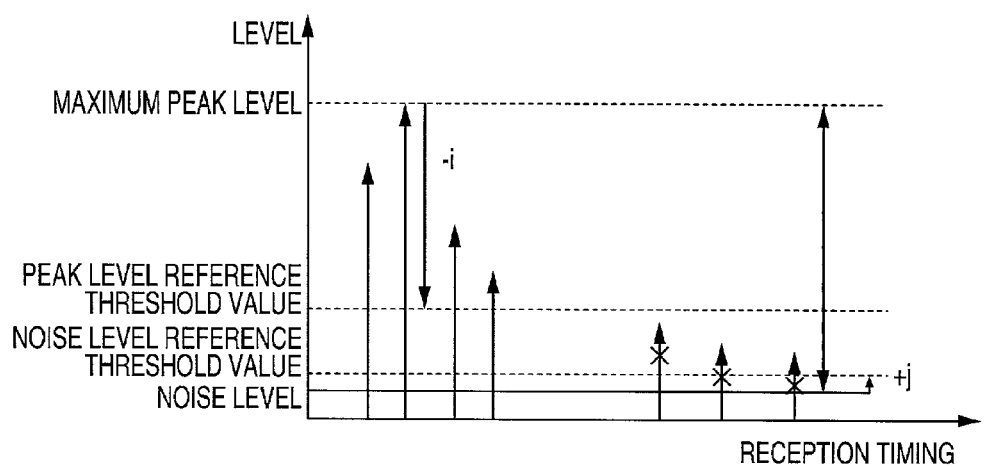
FIGS. 2A and 2B are graphs showing a specific example of the conventional threshold value processing.
Figure 2B:
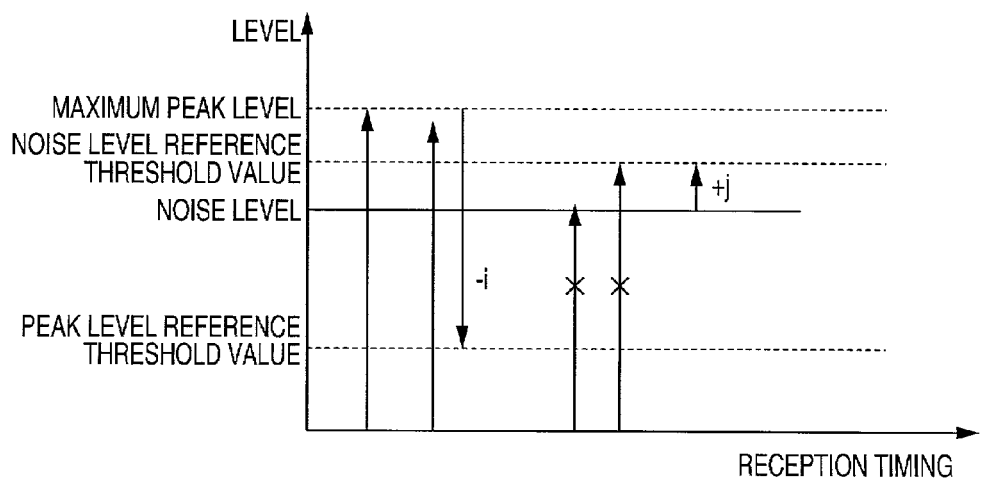

A CDMA receiving apparatus and a method of detecting path timings according to the present invention will be described below with reference to the attached drawings. The following description gives the embodiments of the present invention but does not limit them.

The First Embodiment

The CDMA receiving apparatus and the method of detecting path timings of the first embodiment of the present invention will be described with reference to FIGS. 5 to 10C and a table 1. First, the structure and operation in the first embodiment will be described with reference to FIGS. 5 to 7.

FIG. 5 is a block diagram showing the structure of the CDMA receiving apparatus in the first embodiment.

As shown in FIG. 5, the CDMA receiving apparatus 10 is composed of a finger section 11, a searcher section 12, a RAKE synthesizing section 13 and a decoding section 14. Also, the above-mentioned finger section 11 is composed of n finger units.

A reception signal inputted to the CDMA receiving apparatus 10 is supplied to the finger section 11 and the searcher section 12, respectively. The searcher section 12 finds correlation values while shifting the timing of the despreading of the reception signal a little by little, and looks for the optimal reception timings. Then, the searcher section 12 instructs the reception timing at which the reception signal should be received by the finger section 11 to the fingers #0 to #n which are the finger units of the finger section 11 as peak timings b (hereinafter, search path timings b).

The finger section 11 carries out the despreading of the reception signal at the reception timings instructed as the search path timings b and carries out the detecting operations. The outputs of the finger section 11 are supplied to and added in the RAKE synthesizing sections 13, respectively, and post-addition is decoded by the decoding section 14. Here, the fingers #0 to #n of the finger section 11 are provided in accordance with the number of paths to be processed by the CDMA receiving apparatus 10, and if the number of fingers is n=9 in the finger section 11, the RAKE synthesis of a maximum of 10 paths becomes possible.

FIG. 6 is a block diagram showing the detailed structure of the searcher section 12 in FIG. 5. As shown in FIG. 6, the searcher section 12 is composed of a group of correlation units 21, a group of adders 22, a path control section 23, a spreading code generating section 24 and a search delay circuit 25.

The reception signal is supplied to the searcher section 12 and is supplied to the correlation units of the group 21. The respective correlation units carry out despreading operations at the reception timings which are different from one after another by a little. The correlation value c as the output of each correlation unit is supplied to a corresponding one of the adders of the group 22. Each adder adds or integrates the correlation values c by the specified number of times (which is variable as a parameter) and outputs a post-addition correlation value d to the path control section 23. The, the post-addition value d is referred to as a delay profile, hereinafter. The spreading code generating section 24 generates a spreading code for the correlation units 21 for the despreading operation and output it to the search delay circuit 25. The path control section 23 searches reception timings for paths with higher levels from the post-addition correlation value d and determines whether or not the path at the searched reception timing is a valid path, after detecting a peak. Then, the path control section 23 outputs the reception timing for each path determined to be the valid path to the finger section 11 as the search path timing b.

Figure 7:
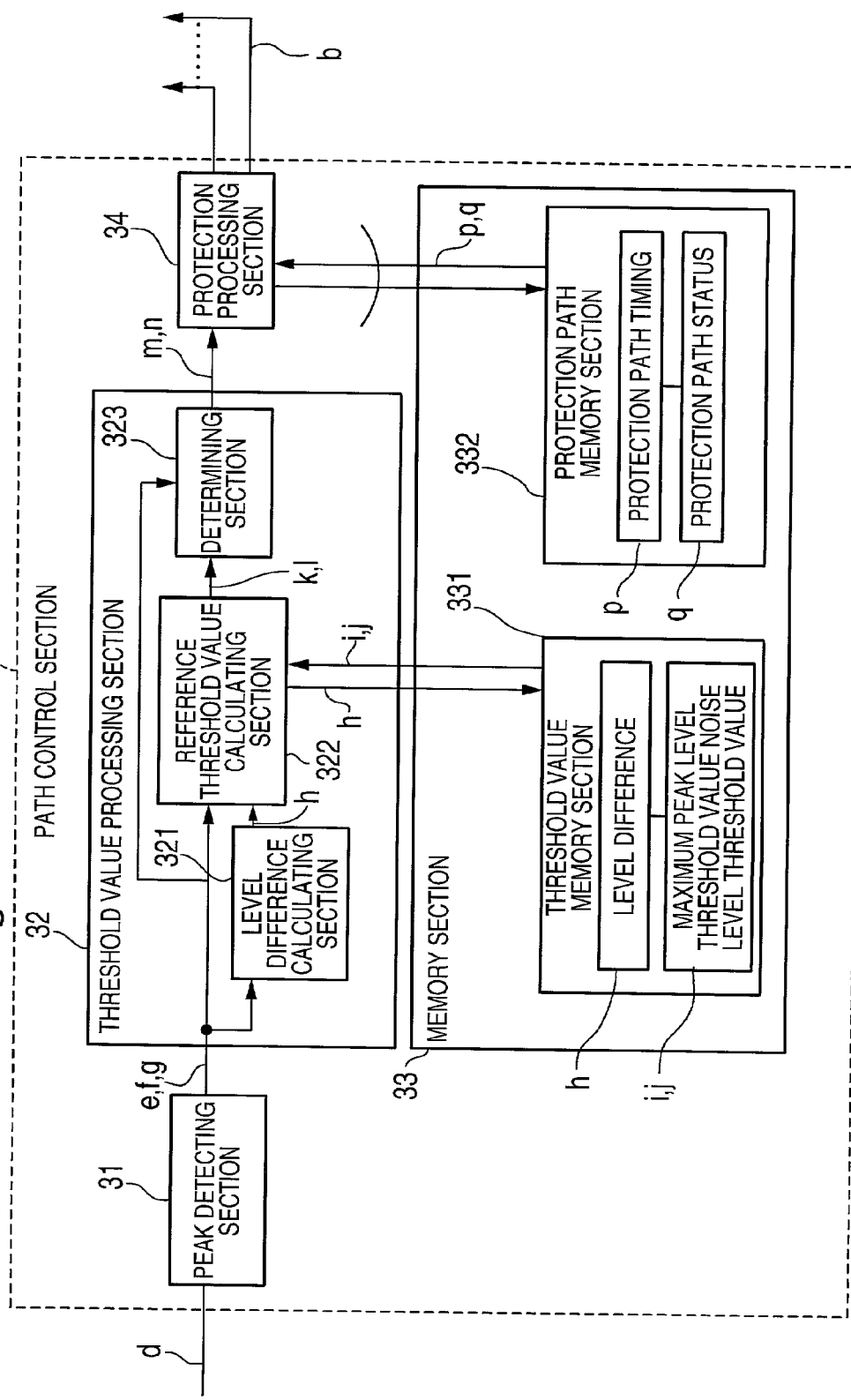
FIG. 7 is a block diagram showing the detailed structure of a path control section in the first embodiment.

FIG. 7 is a block diagram showing the detailed structure of the path control section 23 of FIG. 6. As shown in FIG. 7, the path control section 23 is composed of a peak detecting section 31, a threshold value processing section 32, a memory section 33 and a protection processing section 34. Also, the above-mentioned threshold value processing section 32 is composed of a level calculating section 321, a reference threshold value calculating section 322 and a determining section 323. Moreover, the above-mentioned memory section 33 is composed of a threshold value memory section 331 and a protection path memory section 332. The threshold value memory section 331 holds the level difference h sent from the reference threshold value calculating section 322, and a maximum peak level threshold value i and a noise level threshold value j which are predetermined in accordance with the level difference h. The above protection path memory section 332 holds a protection path timing p and a protection path state q which are sent from the above protection processing section 34.

The peak detecting station 31 searches the reception timings with high levels for the specified number of peaks (which are variable as a parameter) from the correlation value d after the addition which is transmitted from the above-mentioned adder group 22, and outputs a peak timing e for each path and a peak level f to the threshold value processing section 32, after detecting the peak. In the same way, the peak detecting station 31 calculates an average of the correlation values d after the addition except the peak and outputs to the threshold value processing section 32 as a noise level g.

In the threshold value processing section 32, the level difference calculating section 321 calculates the level difference h between the maximum peak level of the peak levels f and the noise level g and outputs it to the reference threshold value calculating section 322. The reference threshold value calculating section 322 reads the maximum peak level threshold value i and the noise level threshold value j from data which have been previously stored in the threshold value memory section 331 in accordance with the level difference h. Then, the reference threshold value calculating section 322 calculates the peak level reference threshold value k from the maximum peak level and the maximum peak level threshold value i. Also, the reference threshold value calculating section 322 calculates the noise level reference threshold value l from the noise level g and the noise level threshold value j. Moreover, the reference threshold value calculating section 322 outputs the peak level reference threshold value k and the noise level reference threshold value l to the determining section 323.

Here, it is supposed that the peak level reference threshold value k is lower than the maximum peak level by the maximum peak level threshold value i. Also, it is supposed that the noise level reference threshold value l is higher than the noise level g by the noise level threshold value j. The values of the maximum peak level threshold value i and noise level threshold value j are separated by the level difference h between the maximum peak level and the noise level g. The peak level reference threshold value k is set to be a higher value, when the level difference h is larger, that is, in the propagation environment in which there is so a stronger path as to be error free, compared with the case that there is no so strong path. Therefore, when the level difference h is larger, the maximum peak level threshold value i is decreased. On the other hand, the noise level reference threshold value l is set to be a lower vale when the level difference h is smaller, that is, in the propagation environment near the sensitivity point, compared with the case that the peak is not near the sensitivity point. Therefore, the level difference i is smaller, the noise level threshold value j is set to be smaller.

The determining section 323 carries out the threshold value processing to select paths equal to or higher than the peak level reference threshold value k and the noise level reference threshold value l from among the supplied peak levels f. Then, the determining section 323 outputs each of the paths with levels equal to higher than the threshold value to the protection processing section 34 as a search peak timings m and a search peak level n. The protection processing section 34 reads data as a result of the protection processing in the previous cycle, i.e., a protection path timing p and protection path state q from the protection path memory section 332, and carries out the protection processing by comparing the read path and the path found out in the current cycle to determines a valid path. Then, the protection processing section 34 outputs the reception timing of each path determined to be the valid path to the finger section 11 at the search path timing b. Also, the protection processing section 34 writes the protection path timing p and the protection path state q which are as the result of the protection processing in the current cycle in the protection path memory section 332.

Figure 8:
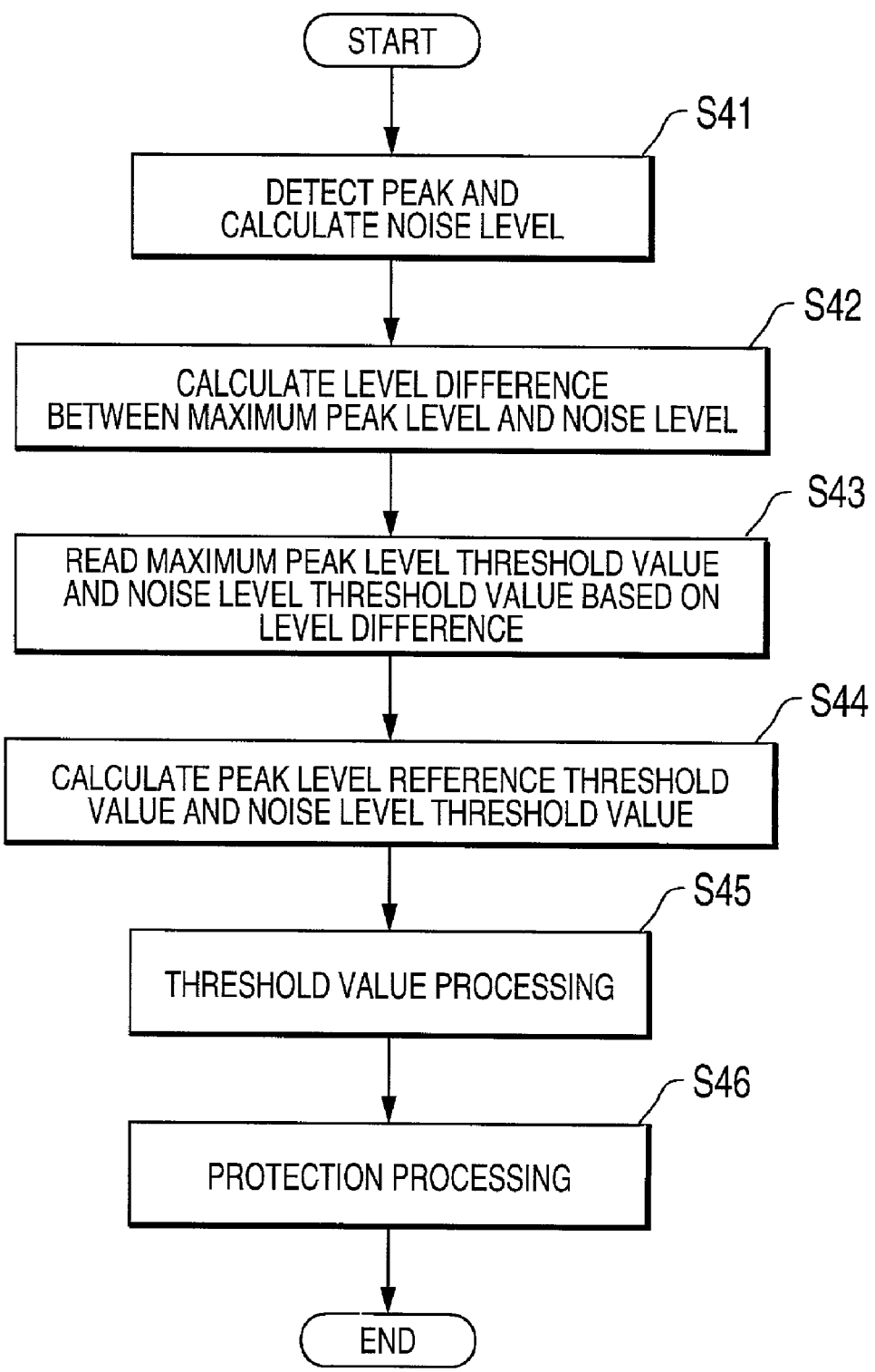
FIG. 8 is a flow chart showing an operation of the CDMA receiving apparatus in the first embodiment.

Next, the details of the operation of the first embodiment will be described with reference to FIGS. 8 to 10C and the table 1. FIG. 8 is a flow chart of the operation of the first embodiment.

The peak detecting station 31 searches the reception timings with higher levels for the specified number of peaks (which are variable as a parameter) from the post-addition correlation value or the delay profile d, and outputs the peak timing e of each path and the peak level f of the path to the threshold value processing section 32. Moreover, the peak detecting station 31 calculates an average of the post-addition correlation values d except for the peaks as a noise level g and outputs it to the threshold value processing section 32 (S41 of FIG. 8)

Figure 9:
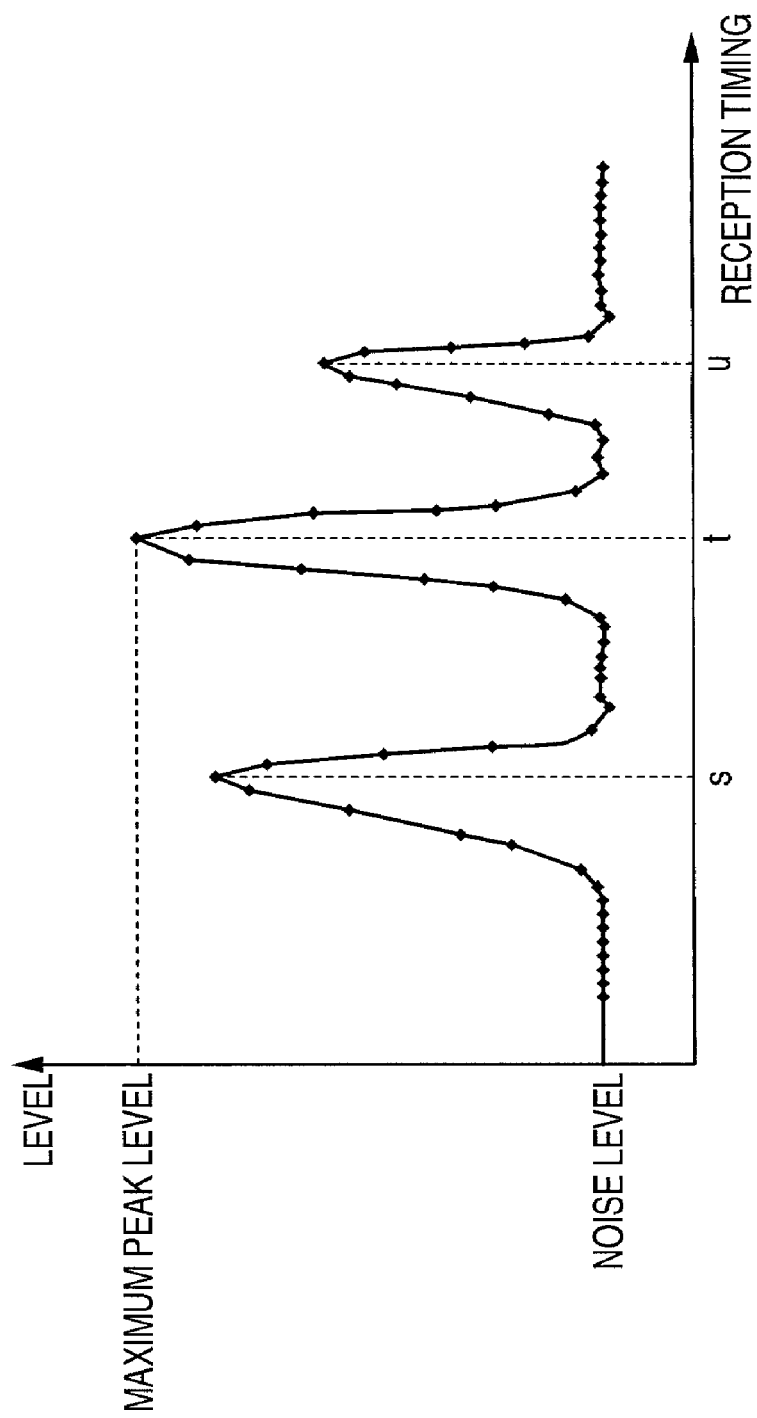
FIG. 9 is a graph showing relation of reception timing and post-addition correlation value.

FIG. 9 is a graph which is called the delay profile showing relation of the reception timings and the post-addition correlation values d.

Figure 10A:
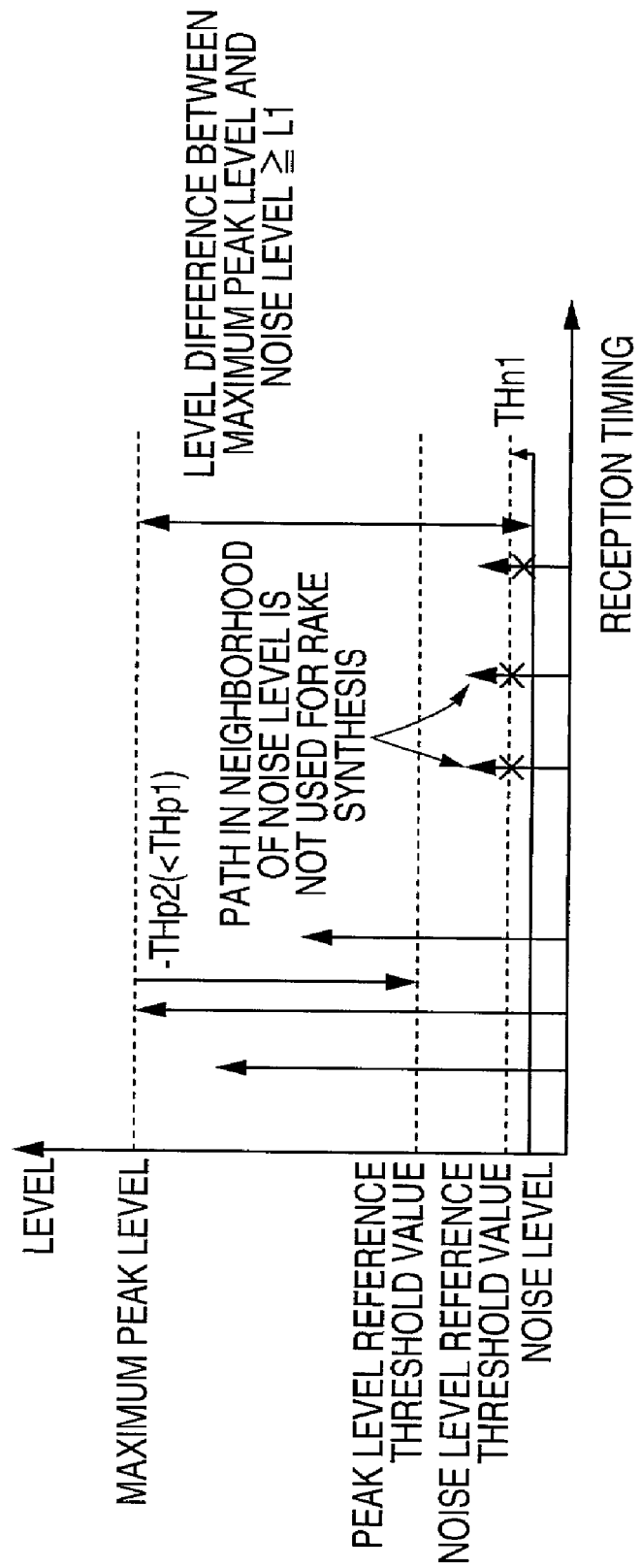

In FIGS. 10A to 10C, the horizontal axis shows the reception timing and the vertical axis shows a level of the post-addition correlation values d. FIGS. 10A to 10C shows that three paths for the different reception timings exist as an example. This means that a multipath exists. It should be noted that symbols s, t and u show the reception timings that the levels of the paths becomes maximum. Also, FIGS. 10A to 10C shows the levels of the paths having delay quantity t in the reception timings s, t and u, respectively is maximum, i.e., the path is a maximum peak level.

The level difference calculating section 321 calculates the level difference h between the maximum peak level of the peak levels f and the noise level g and outputs to the reference threshold value calculating section 322 (S42 of FIG. 8).

The reference threshold value calculating section 322 reads the maximum peak level threshold value i and the noise level threshold value j as data corresponding to the level difference h from the threshold value memory section 331 (S43 of FIG. 8). Then, the reference threshold value calculating section 322 calculates the peak level reference threshold value k from the maximum peak level and the maximum peak level threshold value i, i.e., ((the peak level reference threshold value k)=(the maximum peak level)−(the maximum peak level threshold value i)). Also, the reference threshold value calculating section 322 calculates the noise level reference threshold value l from the noise level g and the noise level threshold value j, i.e., ((the noise level reference threshold value l)=(the noise level g)+ (the noise level threshold value j)). The reference threshold value calculating section 322 outputs to the determining section 323 (S44 of FIG. 8).

TABLE 1

| propagation circumstance | difference between maximum peak level and noise level | maximum peak level threshold value | noise level threshold value |
|---|---|---|---|
| in case of being so a strong path as to be error free | ^L1 | THp 2 (<THp1) | THn1 |
| in case of not being so a strong path as to be error free but not being near sensitivity point | L1 > and ^L2 | THp1 | |
| in case of being near sensitivity point | L2 > | | THn2 (<THn1) |

The table 1 shows an example of the maximum peak level threshold value i and the noise level threshold value j which correspond to the level difference h between the maximum peak level and the noise level g. The values of the maximum peak level threshold value i and noise level threshold value j are determined in accordance with the level difference h between the maximum peak level and the noise level g. When there is not so a strong path as to be error free and the path is not near the sensitivity point, specifically, the level difference h is equal to or more than L2 and less than L1 (L1, L2 are predetermined values), it is set to i=Thp1 and j=Thn1 (Thp1 and Thn1 are predetermined values). When level difference h is large relatively, that is, when the propagation environment has so a stronger path as to be error free, the peak level reference threshold value k is increased, compared with the case which there is no a strong path, and an unstable path near the noise level is invalidated through the threshold value processing. When the level difference h is large, the maximum peak level threshold value i is set to be smaller. Specifically, when the level difference h is equal to or more than L1, it is set to i=Thp2, Thp2<Thp1 (Thp2 is a predetermined value), j=Thn1. On the other hand, when the level difference h is small relatively, that is, in the propagation environment near the sensitivity point, the noise level reference threshold value l is decreased, compared with the case which is not near the sensitivity point. Thus, the noise level threshold value j is set to be smaller such that it is possible to detect the paths used for the RAKE synthesis near the sensitivity point, as the level difference h is smaller. Specifically, when the level difference h is less than L2, it is set to j=Thn2, Thn2<Thn1 (Thn2 is a predetermined value), i=Thp1.

The determining section 323 carries out the threshold value processing to select paths equal to or higher than the peak level reference threshold value k and the noise level reference threshold value l from the supplied peak levels f. Then, the determining section 323 outputs a path with a peak level equal to or higher than the peak level reference threshold value k and noise level reference threshold value l and the reception timing for the path to the protection processing section 34 as the search peak timing m and the search peak level n (S45 of FIG. 8).

The protection processing section 34 reads the protection path timing p and the protection path state q which are as the result of the protection processing in the previous cycle, from the protection path memory section 332. The protection processing section 34 carries out the protection processing using the search peak timing m for the path which is found out in the current cycle and determines a valid path (S46 of FIG. 8). Then, the protection processing section 34 outputs a reception timing of each path to have determined to be the valid path to the finger section 11 as the search path timing b. Also, the protection processing section 34 writes the protection path timing p and the protection path state q as the result in the current cycle in the protection path memory section 332.

In the protection processing, when the path found out in the previous cycle and the reception timing of the path are not found out in the current cycle, the path is not directly determined to be an invalid path. It is determined to be the invalid path when this state continues for a predetermined number of times (The front protection processing). In the same way, the path which is first found out in the current cycle is not directly determined to be a valid path. When this state continues for a predetermined number of times and the path is detected at the same reception timing, the path is determined to be a valid path (The back protection processing). The predetermined number of times is possible to set as the parameter. In this way, the protection processing is carried out in such a manner that the allocation of the valid path is not frequently changed even if the level is changed due to fading and the reception timing changes little.

Here, the protection path state is the number of times of non-detection the valid path or the number of times of detection of the invalid path for the path which is counted to a predetermined number of times which is set, in case of the front protection processing or the back protection processing. Also, the protection path timing indicates the reception timing of the path to which the protection processing is carried out. The path to which the protection processing is carried out is called as the protection path.

Moreover, the operation of the first embodiment will be described using a specific example and referring to FIGS. 10A to 10C. FIGS. 10A to 10C are graphs showing the specific instance of the threshold value processing in accordance with the level difference h between the maximum peak level and the noise level g. FIG. 10A is a graph showing the threshold value processing in case of being the propagation environment in which there is so a stronger path as to be error free. FIG. 10B is a graph showing the threshold value processing in case of being the propagation environment in which there is not so a stronger path as to be error free and not being near the sensitivity point. FIG. 10C is a graph showing the threshold value processing in case of the propagation environment near the sensitivity point.

Because FIG. 10B shows that the level difference h is lower than L1 and equal to or higher than L2, the maximum peak level threshold value i is THp1 from the table 1, and the noise level threshold value j is THn1 from the table 1.

Next, because the level difference h is equal to or higher than L1 in FIG. 10A, the maximum peak level threshold value i is THp2 (<THp1) from the table 1. Because the peak level reference threshold value k is increased, compared with the case that the maximum peak level threshold value i shown in FIG. 10B is THp1, only a strong path is selected and an unstable path near the noise level is not selected. With this, the conventional problems can be eliminated that because an unstable path near the noise level is used for the RAKE synthesis in the propagation environment in which there is so a stronger path as to be error free, reception characteristic becoming bad.

On the other hand, because the level difference h is lower than L2 in FIG. 10C the noise level threshold value j is THn2 (<THn1) from the table 1. Because the noise level reference threshold value l is decreased, compared with the case that the noise level threshold value j shown in FIG. 10B is THn1, the path used for RAKE synthesis can be detected. With this, the conventional problems can be eliminated that reception characteristic becomes bad, because the path used for RAKE synthesis cannot be detected in the propagation environment near the sensitivity point.

The Second Embodiment

Next, the CDMA receiving apparatus and the method of detecting path timings according to the second embodiment of the present invention will be described with reference to FIG. 11.

Figure 11:
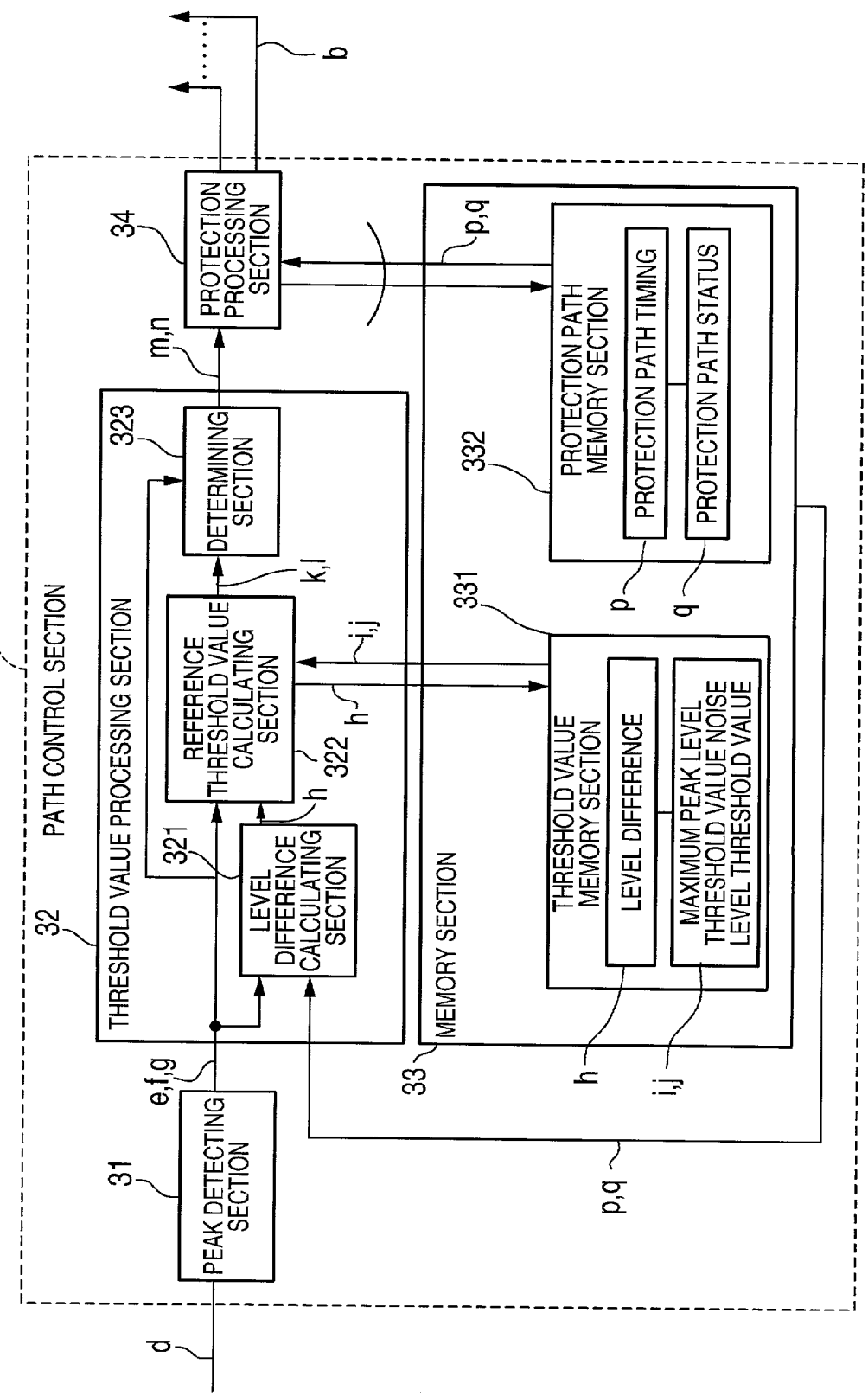
FIG. 11 is a block diagram showing the detailed structure of the path control section in a second embodiment.

FIG. 11 is a block diagram showing the detailed structure of the path control section 23 of the second embodiment. As shown in FIG. 11, the path control section 23 in the second embodiment is composed of the components like those of the above-mentioned first embodiment. However, the second embodiment is different from the above-mentioned first embodiment in the point that the path control section 23 in the second embodiment is connected to the protection path memory section 332 and the level calculating section 321.

The operation of the second embodiment in which the protection path memory section 332 is connected with the level difference calculating section 321 will be described.

In case of path detection, the level is easy to change in a moment due to fading and it is easy for the reception timing to change. Therefore, in the second embodiment, a threshold value is used in accordance with the level difference h between maximum level and the noise level for the stable valid path.

The peak detecting station 31 searches or looks for the reception timing with high level for the specified number of peaks (which is changeable as a parameter) from the correlation values d after the addition. After detecting the peak, the peak detecting station 31 outputs the peak timing e and the peak level f of each path to the threshold value processing section 32. Moreover, the peak detecting station 31 calculates an average of the correlation values d after the addition except for the peak and outputs to the threshold value processing section 32 as a noise level g.

In the threshold value processing section 32, the level difference calculating section 321 first reads the protection path timing p and the protection path state q as the result of the protection processing in the previous cycle from the protection path memory section 332. Next, the level difference calculating section 321 searches the valid path from among the peaks found out in the current cycle by comparing the peaks found out in the current cycle and the protection paths. The level difference calculating section 321 calculates the level difference h between the level of the path with maximum level in the valid paths and the noise level g. The reference threshold value calculating section 322 reads the maximum peak level threshold value i and the noise level threshold value j from the threshold value memory section 331 in accordance with the level difference h and calculates the peak level reference threshold value k and the noise level reference threshold value l. When there is not a valid path in the peaks found out in the current cycle, the reference threshold value calculating section 322 uses a path with the maximum level in the peaks found out in the current cycle, like the above-mentioned first embodiment.

The determining section 323 carries out the threshold value processing to select a path equal to or higher than the peak level reference threshold value k and the noise level reference threshold value l from the supplied peak levels f. Then, the determining section 323 outputs reception timing and a peak level of the path equal to or higher than the above-mentioned peak level reference threshold value k and noise level reference threshold value l to the protection processing section 34 as a search peak timing m and a search peak level n.

The protection processing section 34 reads the protection path timing p and the protection path state q as the result of the protection processing in the previous cycle from the protection path memory section 332. Then, the protection processing section 34 carries out the protection processing using the search peak timing m of the path found out in the current cycle and determines a valid path. Then, the protection processing section 34 outputs the reception timing of each path determined to be a valid path to the finger section 11 as the search path timing b. Also, the protection processing section 34 writes the protection path timing p in the current cycle and the protection path state q in the protection path memory section 332.

It is possible to receive a signal more stably by carrying out the threshold value processing using the threshold values which are determined in accordance with the level difference h between the maximum peak level and the noise level of the above mentioned stable valid path.

The Third Embodiment

Figure 12:
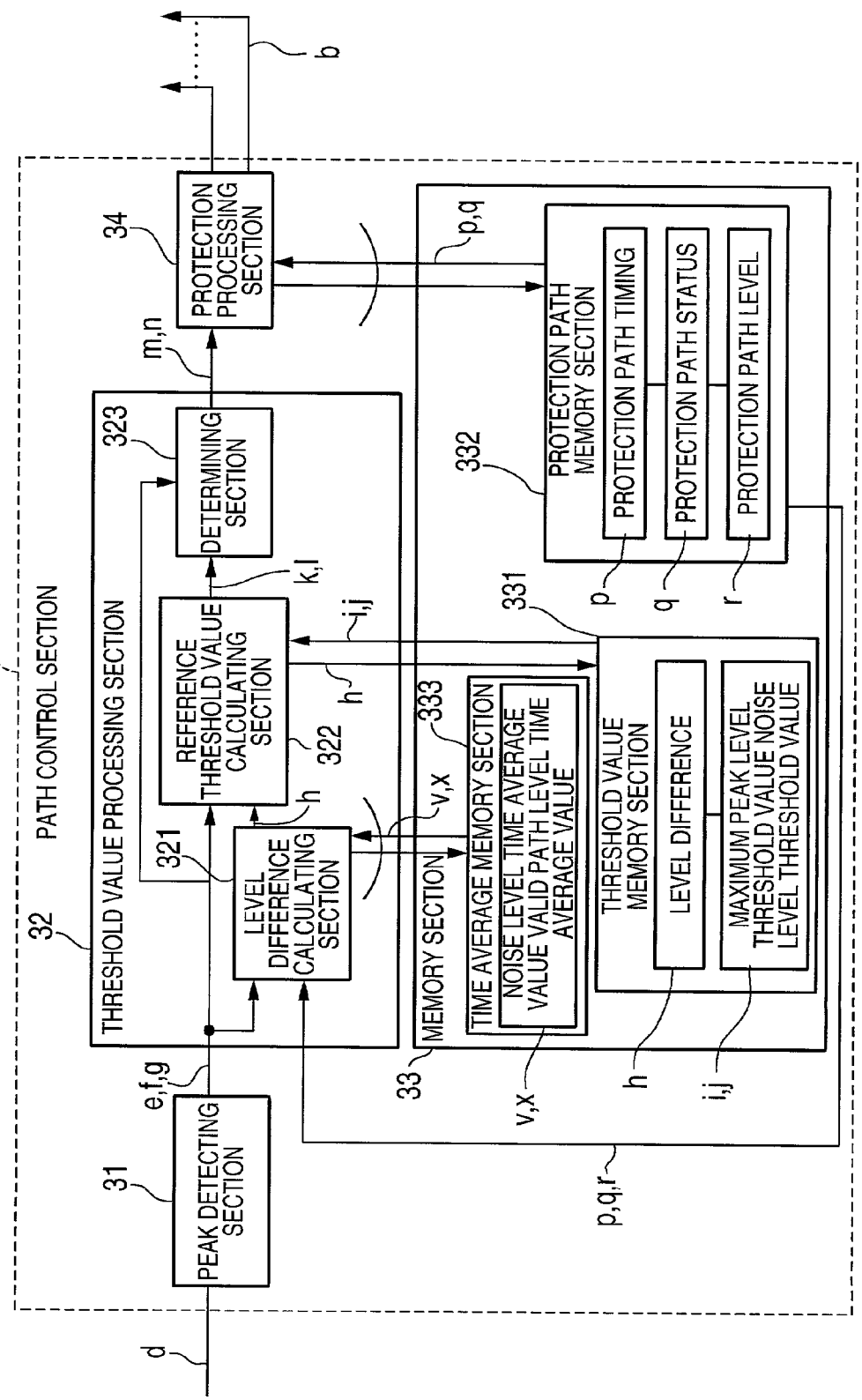
FIG. 12 is a block diagram showing the detailed structure of a path control section in a third embodiment.

Next, the CDMA receiving apparatus and the method of detecting path timings according to the third embodiment of the present invention will be described with reference to FIG. 12. FIG. 12 is a block diagram showing the detailed structure of the path control section 23 of the third embodiment. As shown in FIG. 12, the path control section 23 in the third embodiment is composed of the components like those of the above-mentioned first embodiment and a time average memory section 333 is provided as a new component in the memory section 33. In the current cycle average memory section 333 are stored a noise level time average v and a valid path level time average x. Also, the third embodiment is different from the first embodiment in that the above protection path memory section 332 and the above-mentioned level calculating section 321 are connected but is same as the above-mentioned second embodiment. Moreover, the third embodiment differs from the above-mentioned first embodiment and second embodiment in that the protection path level r is stored in the above protection path memory section 332.

An operation of the third embodiment will be described in which the protection path memory section 332 and the level difference calculating section 321 are connected with each other, the protection path level r is stored in the above protection path memory section 332, and the noise level time average v and the valid path level time average x are stored in the time average memory section 333.

In case of the path detection, the level is easy to change due to fading and so on temporally and the reception timing is easy to change. Therefore, in the third embodiment, a time averaging process is carried out using oblivion coefficients.

First, the protection processing section 34 reads the protection path timing p and the protection path state q as the result of the protection processing in the previous cycle from the protection path memory section 332. Next, the protection processing section 34 carries out the protection processing using the search peak timing m as the reception timing of the path found out in the current cycle, and determines valid paths. Also, the protection processing section 34 averages levels in time using a predetermined oblivion coefficient to each of the protection paths. The time average level is set as the protection path level r. Then, the protection path level r is stored in the protection path memory section 332 like the protection path timing p and the protection path state q in the current cycle.

The peak detecting station 31 searches or looks for the reception timing with a high level for the specified number of peaks (which is changeable as a parameter) from the correlation values d after the addition. After detecting a peak, the peak detecting station 31 outputs a peak timing e of each path and a peak level f to the threshold value processing section 32. Moreover, the peak detecting station 31 calculates an average of the correlation values d after the addition except the peak and outputs to the threshold value processing section 32 as a noise level g.

Next, the level calculating section 321 carries out a time averaging process to the noise levels g sent from the peak detecting section 31 in the current cycle, using predetermined oblivion coefficients. The time average level is set as the noise level time average v. Then, the noise level time average v as a result in the current cycle is stored in the time average memory section 333.

Moreover, the level difference calculating section 321 reads out the protection path timing p, the protection path state q and the protection path level r as a result of the protection processing in the previous cycle from the protection path memory section 332. The level difference calculating section 321 looks for the valid paths from among the peaks found out in the current cycle by comparing the peaks found out in the current cycle and the protection paths, and carries out a time averaging process to the levels of the valid paths using predetermined oblivion coefficients. The time averaged level is set as the valid path level time average x. Then, the valid path time average x as the result in the current cycle is stored in the time average memory section 333.

The time averaging process using the oblivion coefficients will be described here using an equation.

It is supposed that the oblivion coefficient λ, the level indicating the result of the time averaging process to the previous cycle, i.e., the level obtained in the process in the previous cycle is Lvl(n−1), and the level in the current cycle is Lvl(n). In this case, the level obtained through the time averaging process in the current cycle (hereinafter, Lvl) is shown by the following equation.

$$Lvl = \lambda \times Lvl(n) + (1-\lambda) \times Lvl(n-1)$$

In the first time, because there is not a level in the previous cycle, Lvl=Lvl(n). Also, because there is not a level in the current cycle for the path during the front protection, the level with a larger one of the peak level reference threshold value k and the noise level reference threshold value l is set as a level in the current cycle.

The reference threshold value calculating section 322 reads the maximum peak level threshold value i and the noise level threshold value j from the threshold value memory section 331 in accordance with the level difference h between the path with the maximum level of the valid path level average x in the current cycle and the noise level time average v in the current cycle. Then, the reference threshold value calculating section 322 calculates the peak level reference threshold value k and the noise level reference threshold value l. When there is not a valid path in the peaks found out in the current cycle, a path with the maximum level among the peaks found out in the current cycle is used like the above-mentioned first embodiment.

The determining section 323 carries out the threshold value processing to select paths equal to or higher than the peak level reference threshold value k and the noise level reference threshold value l from supplied peak levels f. Then, the determining section 323 outputs a reception timing and a peak level of the path equal to or higher than the above-mentioned peak level reference threshold value k and noise level reference threshold value l to the protection processing section 34 as a search peak timing m and a search peak level n.

As mentioned above, the threshold value processing is carried out using a level difference between the time average of the maximum peak levels of the valid paths and the time average of the noise levels so that a small fluctuation is ignored and a large change is incorporated. Therefore, the more stable reception becomes possible.

The first effect is in that a conventional problem can be eliminated in which an unstable path near the noise level is used for the RAKE synthesis in the propagation environment in which there is so a stronger path as to be error free, so that the reception characteristic is deteriorated.

The reason is in that the values of the maximum peak level threshold value i and noise level threshold value j are separated based on a level difference h between the maximum peak level and the noise level g in case of the threshold value processing, and the peak level reference threshold value k is increased when there is a so a stronger path as to be error free, compared with the case which there is not a strong path, so that the unstable path near the noise level is invalidated in the threshold value processing and is not used for the RAKE synthesis.

The second effect is in that a conventional problem can be eliminated in which all paths for the peaks found out in the current cycle are invalidated in the threshold value processing in the propagation environment near the sensitivity point so that a path used for the RAKE synthesis can not be detected, resulting in deterioration of the reception characteristic.

The reason is in that the values of the maximum peak level threshold value i and noise level threshold value j are separated based on the level difference h between the maximum peak level and the noise level g in case of the threshold value processing, and in the case near the sensitivity point, the noise level reference threshold value l is decreased, compared with the case of being not sensitivity point, so that in the propagation environment near the sensitivity point, the path used for RAKE synthesis can be detected.

In the conventional technique, the optimal threshold value processing cannot be carried out in consideration of the level difference between the maximum peak level and the noise level, regardless of that the level difference becomes large in the propagation environment in which there is so a stronger path as to be error free, and the level difference between the maximum peak level and the noise level becomes small in the propagation environment near the sensitivity point. On the other hand, according to the present invention, a threshold value is calculated in accordance with the level difference between the maximum peak level and the noise level. Therefore, the optimal threshold value processing can be carried out in consideration of the level difference. The optimal threshold value processing can be carried out in all the propagation environments in which the level difference between the maximum peak level and the noise level changes.

Therefore, according to the present invention, the above-mentioned threshold value is relatively separated from the above-mentioned noise level in the propagation environment in which there is so a stronger path as to be error free, in which the level difference becomes larger between the maximum peak level and the noise level gets. Therefore, many unstable paths near the noise level can be cut relatively more through the threshold value processing. Also, the above-mentioned threshold value is relatively brought close to the above-mentioned noise level in the propagation environment near the sensitivity point in which the level difference becomes small between the maximum peak level and the noise level. Therefore, relatively many paths are detected near the noise level and the relatively enough number of paths can be used for the RAKE synthesis as a whole. As a result, optimal threshold value processing is carried out in all types of the propagation environment where the level difference between the maximum peak level and the noise level changes and a good reception characteristic can be realized.

What is claimed is:

1. A CDMA receiving apparatus comprising:
   a searcher section which has a protection path memory, generates a delay profile from a reception signal, finds peaks from said delay profile based on a variable peak level reference threshold value and a variable noise level reference threshold value which are determined based on said delay profile, reads out protection path data in a previous cycle from said protection path memory, and determines timings of valid paths based on timing of said found peaks and protection path timings of the read out protection path data;
   a finger section which detects a signal from said reception signal for every path in response to said valid path timings;
   a RAKE synthesizing section which carries out RAKE synthesis to the detected signals to produce a RAKE synthesis signal; and
   a decoding section which decodes said RAKE synthesis signal.

2. The CDMA receiving apparatus according to claim 1, wherein said searcher section variably determines said variable peak level reference threshold value and said variable noise level reference threshold value based on a maximum peak level and a noise level in said delay profile.

3. The CDMA receiving apparatus according to claim 2, wherein said searcher section has a threshold value memory storing a maximum peak level threshold value and a noise level threshold value, and
   said searcher section calculates a level difference between said maximum peak level and said noise level in said delay profile, and reads out said maximum peak level threshold value and said noise level threshold value from said threshold value memory based on said level difference, and determines said variable peak level reference threshold value and said variable noise level reference threshold value based on said maximum peak level and said noise level in said delay profile and said maximum peak level threshold value and said noise level threshold value.

4. The CDMA receiving apparatus according to claim 3, wherein said searcher section determines said variable peak level reference threshold value by subtracting said maximum peak level threshold value from said maximum peak level, and said variable noise level reference threshold value by adding said noise level threshold value to said noise level.

5. The CDMA receiving apparatus according to claim 3, wherein said maximum peak level threshold value has a larger value when said level difference is lager and said noise level threshold value has a smaller value when said level difference is smaller.

6. The CDMA receiving apparatus according to claim 1, wherein said searcher section finds said peaks from said delay profile based on said variable peak level reference threshold value and said variable noise level reference threshold value which are determined based on said protection path data in addition to said delay profile.

7. The CDMA receiving apparatus according to claim 6, wherein said searcher section variably determines said variable peak level reference threshold value and said variable noise level reference threshold value based on a maximum peak level for said valid paths indicated by said protection path data and a noise level in said delay profile.

8. The CDMA receiving apparatus according to claim 7, wherein said searcher section has a threshold value memory storing a maximum peak level threshold value and a noise level threshold value, and
   said searcher section calculates a level difference between said maximum peak level and said noise level in said delay profile, and reads out said maximum peak level threshold value and said noise level threshold value from said threshold value memory based on said level difference, and determines said variable peak level reference threshold value and said variable noise level reference threshold value based on said maximum peak level and said noise level in said delay profile and said maximum peak level threshold value and said noise level threshold value.

9. The CDMA receiving apparatus according to claim 8, wherein said searcher section determines said variable peak level reference threshold value by subtracting said maximum peak level threshold value from said maximum peak level, and said variable noise level reference threshold value by adding said noise level threshold value to said noise level.

10. The CDMA receiving apparatus according to claim 8, wherein said maximum peak level threshold value has a larger value when said level difference is lager and said noise level threshold value has a smaller value when said level difference is smaller.

11. The CDMA receiving apparatus according to claim 1, wherein said searcher section variably determines said variable peak level reference threshold value and said variable noise level reference threshold value based on a time average of peak levels of said valid paths indicated by said protection path data and a time average of noise levels in place of said maximum peak level and said noise level in said delay profile.

12. The CDMA receiving apparatus according to claim 11, wherein said searcher section has a threshold value memory storing a maximum peak level threshold value and a noise level threshold value, and
   said searcher section calculates a level difference between said peak level time average and said noise level time average, and reads out said maximum peak level threshold value and said noise level threshold value from said threshold value memory based on said level difference, and determines said variable peak level reference threshold value and said variable noise level reference threshold value based on said maximum peak level and said noise level in said delay profile and said maximum peak level threshold value and said noise level threshold value.

13. The CDMA receiving apparatus according to claim 12, wherein said searcher section determines said variable peak level reference threshold value by subtracting said maximum peak level threshold value from said maximum peak level, and said variable noise level reference threshold value by adding said noise level threshold value to said noise level.

14. The CDMA receiving apparatus according to claim 12, wherein said maximum peak level threshold value has a larger value when said level difference is lager and said noise level threshold value has a smaller value when said level difference is smaller.

15. A method of determining path timings in a CDMA receiving apparatus comprising the steps of:
   (a) generating a delay profile from a reception signal;
   (b) finding peaks from said delay profile based on a variable peak level reference threshold value and a variable noise level reference threshold value which are determined based on said delay profile;
   (c) reads out protection path data in a previous cycle from said protection path memory; and
   (d) determining timings of valid paths based on timing of said found peaks and protection path timings of the read out protection path data.

16. The method according to claim 15, wherein said (b) step comprises the step of:
   (e) variably determining said variable peak level reference threshold value and said variable noise level reference threshold value based on a maximum peak level and a noise level in said delay profile.

17. The method according to claim 16, wherein said (e) step comprises the steps of:
   (f) calculating a level difference between said maximum peak level and said noise level in said delay profile;
   (g) reading out a maximum peak level threshold value and a noise level threshold value from a threshold value memory based on said level difference, said threshold value memory storing said maximum peak level threshold value and said noise level threshold value; and
   (h) determines said variable peak level reference threshold value and said variable noise level reference threshold value based on said maximum peak level and said noise level in said delay profile and said maximum peak level threshold value and said noise level threshold value.

18. The method according to claim 17, wherein said (h) step comprises the step of:
   (i) determining said variable peak level reference threshold value by subtracting said maximum peak level threshold value from said maximum peak level, and said variable noise level reference threshold value by adding said noise level threshold value to said noise level.

19. The method according to claim 17, wherein said maximum peak level threshold value has a larger value when said level difference is lager and said noise level threshold value has a smaller value when said level difference is smaller.

20. The method according to claim 15, wherein said (b) step comprises the step of:
   (j) finding peaks from said delay profile based on a variable peak level reference threshold value and a variable noise level reference threshold value which are determined based on said protection path data in addition to said delay profile.

21. The method according to claim 20, wherein said (j) step comprises the step of:
   variably determining said variable peak level reference threshold value and said variable noise level reference threshold value based on a maximum peak level for said valid paths indicated by said protection path data and a noise level in said delay profile.

22. The method according to claim 15, wherein said (b) step comprises the step of:
   (k) variably determining said variable peak level reference threshold value and said variable noise level reference threshold value based on a time average of peak levels of said valid paths indicated by said protection path data and a time average of noise levels in place of said maximum peak level and said noise level in said delay profile.

23. A CDMA receiving apparatus comprising:
   a reference threshold value calculating section which calculates a threshold value;
   a determining section which selects one or more paths having peak greater than the threshold value calculated by said reference threshold value calculating section from among a plurality of paths;
   a protection processing section which determines a valid path from the paths selected by said determining section and indicates a timing of the valid path;
   a finger section which detects said valid path using the timing of the valid path indicated by said protection processing section;
   a RAKE synthesizing section which adds a level of the valid path detected by said finger section; and
   a level difference calculating section which calculates a level difference between a maximum peak level of the valid path and a noise level, and
   wherein said reference threshold value calculating section calculates said threshold value in accordance with said level difference.

24. A CDMA receiving apparatus comprising:
   a reference threshold value calculating section which calculates a threshold value;
   a determining section which selects a path having peak greater than the threshold value calculated by said reference threshold value calculating section from among a plurality of path;
   a protection processing section which determines a valid path from the paths which are selected by said determining section and indicates a timing of a valid path;
   a finger section which detects said valid path using the timing of said valid path indicated by said protection processing section;
   a RAKE synthesizing section which adds a level of said valid path which is detected by said finger section; and
   a level difference calculating section which calculates a level difference between a maximum peak level of said valid path and a noise level, and
   wherein said reference threshold value calculating section calculates said threshold value in accordance with said level difference.

* * * * *